April 5, 1960 R. S. ZEBARTH 2,931,486
POWER DRIVE FOR CHAIN CONVEYOR ASSEMBLY
Filed Nov. 13, 1956 2 Sheets-Sheet 1
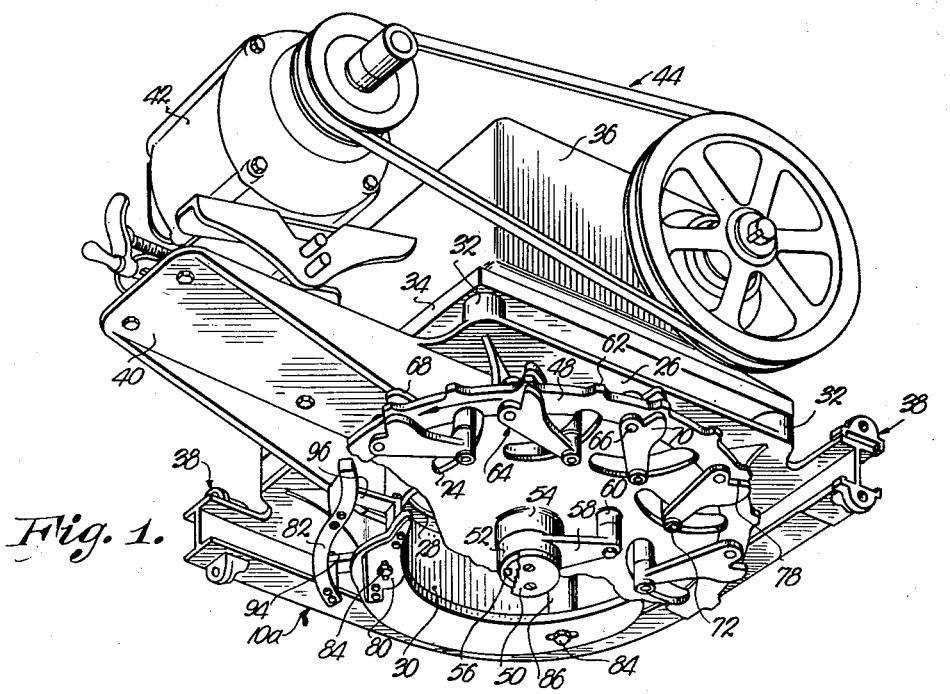
Fig. 1.
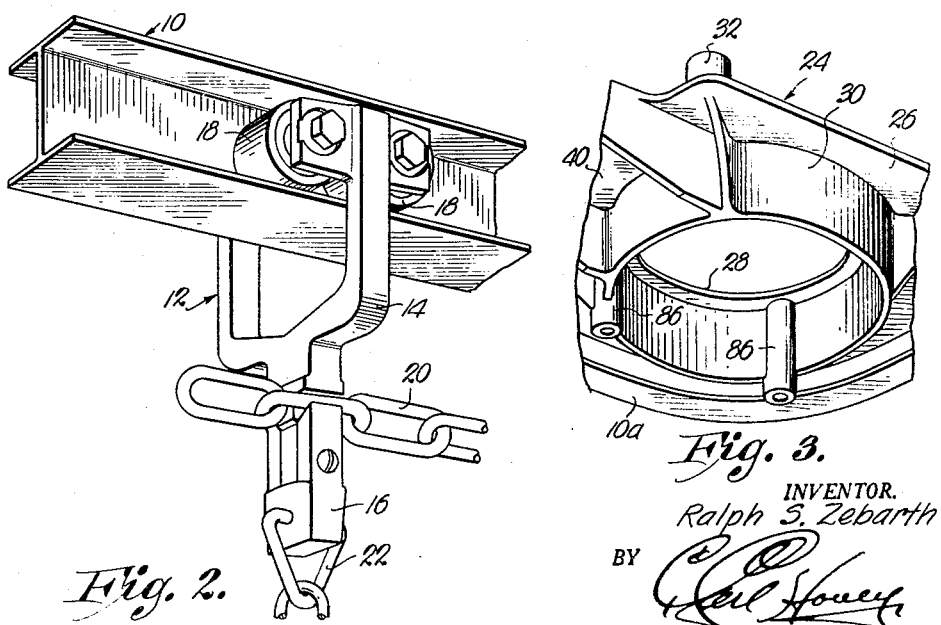
Fig. 2.
Fig. 3.
INVENTOR.
Ralph S. Zebarth
BY
ATTORNEY.

April 5, 1960  R. S. ZEBARTH  2,931,486
POWER DRIVE FOR CHAIN CONVEYOR ASSEMBLY
Filed Nov. 13, 1956  2 Sheets-Sheet 2

INVENTOR.
Ralph S. Zebarth
BY
ATTORNEY.

United States Patent Office 2,931,486
Patented Apr. 5, 1960

2,931,486

POWER DRIVE FOR CHAIN CONVEYOR ASSEMBLY

Ralph S. Zebarth, Hickman Mills, Mo., assignor, by mesne assignments, to Gordon Johnson Company, Kansas City, Mo., a corporation of Missouri Application November 13, 1956, Serial No. 621,946

5 Claims. (Cl. 198—203)

This invention relates to a power drive for conveyors, and particularly to a continuously rotating conveyor-engaging device having movable parts thereon successively engageable with the conveyor and movable out of engagement therewith in a manner to present a smooth, uninterrupted, constant speed advancement in the conveyor without binding, chattering or slippage.

It is the most important object of the present invention to provide a power drive for conveyors of the kind that include a plurality of interconnected carriages and to include in the power drive, means successively engageable with the carriages themselves as they approach an arcuate corner forming a part of a track along which the carriages are advanced for producing improved results not made possible through conventional apparatus that engages the means for interconnecting the carriages.

Another important object is the provision of a power drive for conveyors which have the carriages thereof interconnected by an endless chain, the power drive including a rotatable disc upon which the carriage-engaging elements are mounted and provided with a toothed, peripheral edge that meshes with the chain, thereby maintaining the same arcuate within the curved corner of the track causing the carriages to move smoothly therealong without binding, chattering or undue drag.

A further object of the instant invention is to provide in the aforementioned power drive, cam means for holding the carriage-engaging elements in an operative position only during the time the same are within the arcuate corner of the track and disposed to release the same as the carriages leave the arcuate corner, thereby eliminating the necessity of forcing the elements out of engagement with the carriages under the power of the rotatable device upon which the elements are swingably mounted.

Another object of the instant invention is to provide means for guiding the carriage-engaging elements to one end of their paths of travel prior to engagement with the cam and as the elements approach the corner of the track, thereby assuring proper positioning of the elements at the time of operative engagement with a proximal carriage of the conveyor.

In the drawings:

Figure 1 is a bottom perspective view of a power drive for chain conveyor assemblies made pursuant to my present invention.

Fig. 2 is a fragmentary, perspective view illustrating one of the carriages of the conveyor and a portion of the track upon which it is mounted.

Fig. 3 is a fragmentary, bottom perspective view of the casting shown in Figure 1 and upon which the power drive of the instant invention is mounted.

Figure 4:
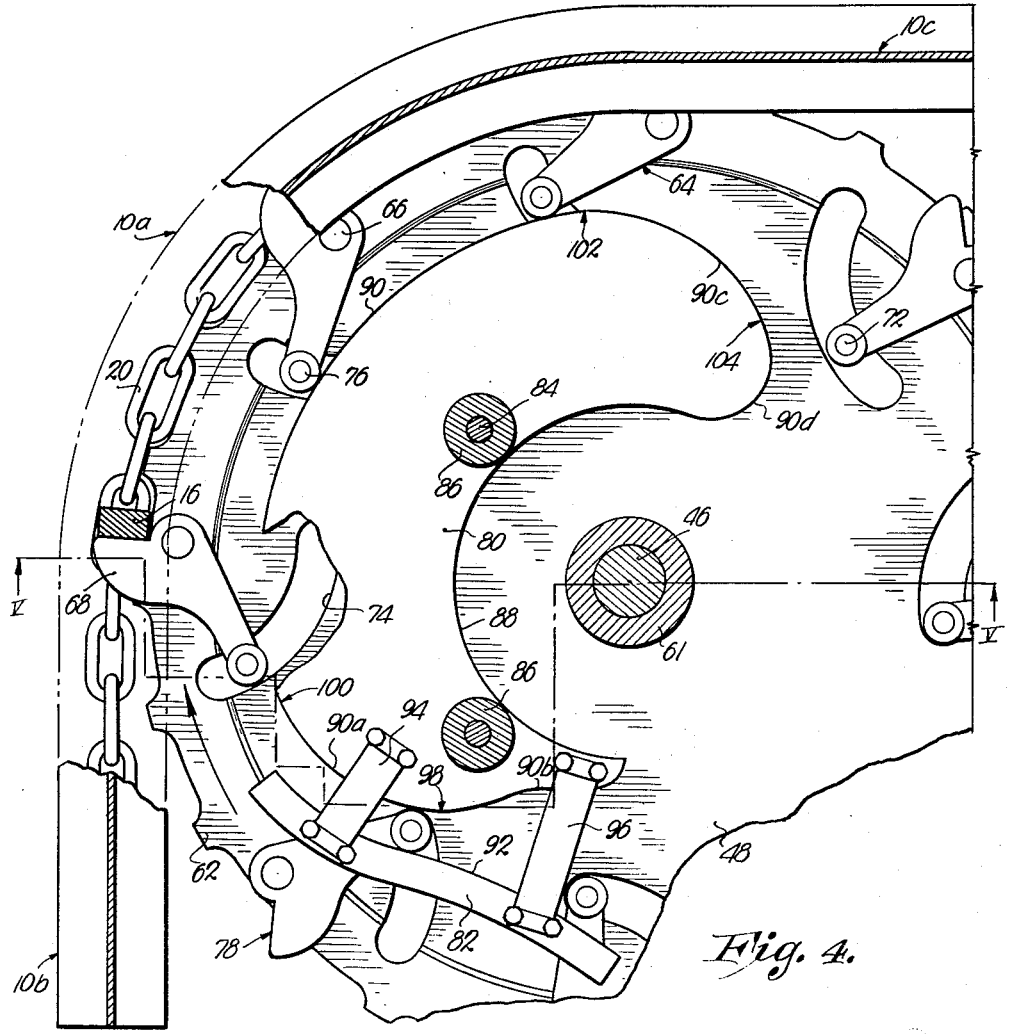
Figure 5:
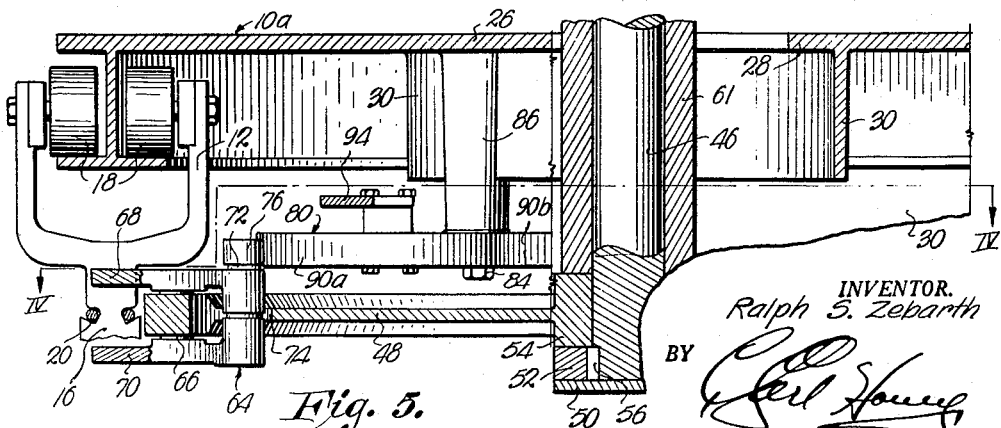

Fig. 4 is an enlarged, fragmentary, horizontal, cross-sectional view through the overhead track, one of the carriages, and through the drive shaft showing the uppermost face of the rotatable disc, parts being broken away and in section for clearness taken substantially on irregular line IV—IV of Fig. 5; and Fig. 5 is a fragmentary, cross-sectional view taken substantially on line V—V of Fig. 4, parts being broken away and in section for clearness.

The conveyor to be actuated by the power drive about to be described includes an overhead track 10 that may be much in the nature of an I-beam as best seen in Figs. 2 and 5, supporting a plurality of spaced-apart carriages 12 that are substantially Y-shaped presenting a yoke 14 having a stem 16 depending therefrom. Yoke 14 embraces the track 10 and is provided with two pairs of opposed rollers 18.

Carriages 12 are interconnected by a flexible member 20 in the nature of a continuous chain, it being noted in Figs. 2 and 5 that the stems 16 extend through a link of the chain 20. Manifestly, any desired article may be suspended from each stem 16, but by way of clarification, it is to be pointed out that a conveyor of the kind just above set forth, is conventionally employed in poultry processing plants, each bird being suspended from a corresponding stem 16 by a shackle (not shown), which shackle is attached in a desired manner to a swingable eye 22 on the lowermost end of the stem 16.

An arcuate corner 10a forming a part of the track 10 is disposed in interconnecting relationship to a pair of annularly displaced, horizontal lengths 10b and 10c of track 10. It is to be preferred that the corner 10a of track 10 form an integral part of a casting broadly designated by the numeral 24, best seen in Fig. 3, and including a horizontal plate 26 provided with a circular opening 28 concentric with a band 30 of larger diameter than the opening 28 and integral with the lower face of plate 26.

Upstanding, internally tapped bosses 32 integral with plate 26, mount base plate 34 of a speed reducer 36 that is, therefore, carried by the plate 26. It is understood that the casting 24 may be suspended from a ceiling or otherwise held in proper position with respect to track lengths 10b and 10c so that the corner 10a thereof may be attached thereto in abutting relationship to the lengths 10b and 10c through the medium of joint-forming means 38 on the track parts 10a, 10b and 10c.

A platform 40 extending laterally from and forming a part of the plate 26, supports a prime mover 42 such as an electric motor which is in turn operably coupled with the speed reducer 36 through belt and pulley means 44. Manifestly, opening 28 and band 30 are concentric with corner 10a and the output shaft 46 of speed reducer 36 depends from the latter vertically through the opening 28 and the band 30 centrally of both.

A circular disc 48 disposed horizontally beneath the band 30 and, therefore, within a plane beneath track 10 but coincident with the plane of chain 20, is supported entirely by the shaft 46 through the medium of a removable plate 50 attached to the lowermost end of the shaft 46. A collar 52 interposed between plate 50 and hub 54 of disc 48, is attached to shaft 46 by key 56, it being seen that both collar 52 and hub 54 are journaled on the shaft 46. Collar 52 is releasably attached to the lower face of disc 48 by a radial arm 58 on the collar 52 having releasable attachment with an internally tapped boss 60 depending from the lower face of disc 48 to one side of its vertical axis of rotation. A tube 21 serving as a bearing for the shaft 46 and depending from the gear reduction unit 36, bears against the upper face of hub 54 to prevent upward movement of the disc 48 on shaft 46.

The peripheral edge of the circular disc 48 is provided with spaced teeth 62 that mesh with the chain 20 in the manner shown in Fig. 4, it being noted that the spaces between the teeth 62 receive the horizontal links of the chain 20.

A plurality of stem-engaging elements 64 are mounted on the disc 48 adjacent its toothed periphery for swinging movement about vertical axes through the medium of stub shafts 66, each element 64 including a pair of identical dogs 68 and 70 having the disc 48 disposed therebetween. The dogs 68 and 70 are interconnected for movement together about their common axes 66 through the medium of shafts 72 at their innermost ends cleared by arcuate slots 74 and journaling a roller 76 above the upper face of disc 48.

The outer ends of the dogs 68 and 70 are provided with flat faces 78 that engage the stems 16 above and below the chain 20 in the manner seen in Figs. 4 and 5. Note in Fig. 4 that the faces 78 extend substantially radially of the shafts 46 and 66 when the elements 64 are in operative engagement with the stems 16 of carriages 12.

Except for the provision of cam means 80 and guide bar 82, the elements 64 are free to swing with respect to the rotating disc 48 about the axes of their shafts 66 since the slots 74 clear the innermost ends of the elements 64. The cam means 80 chosen for illustration is crescent shaped and disposed between the disc 48 and the lower edge of band 30 being attached to the latter by fasteners 84 extending through the cam member 80 into tapped bosses 86 integral with the band 30. Cam plate 80 is provided with a recess 88 defining its innermost edge and clearing shaft 46 and is provided with a cam edge 90 that is concentric with the track corner 10a and, therefore, the shaft 46 throughout a substantial portion of its length. At one end of the plate 80 the edge 90 has a compound curve 90b that recedes inwardly toward the shaft 46, terminating in an arcuate stretch 90a.

Similarly, the cam edge 90 is provided with an arcuate stretch 90c at the opposite end of the cam plate 80 that recedes inwardly toward the shaft 46. The terminal end 90d of the cam edge 90 and substantially all of the compound curve 90b thereof, are spaced from the peripheral edge of the disc 48 a distance sufficient to prevent engagement thereof with the rollers 76. The remaining lengths 90, 90a and 90c of the outermost cam edge of cam plate 80, are disposed however, for engagement by the rollers 76 inasmuch as the plate 80 and the rollers 76 are in the same horizontal plane as seen in Fig. 5.

The elongated bar 82 is also disposed within the plane of rollers 76 in spaced relationship to lengths 90a and 90b of cam edge 90. Bar 82 has a roller-engaging cam edge 92 taking the shape of a compound curve and bar 82 is supported by cam plate 80 through the medium of a pair of U-shaped brackets 94 and 96.

During operation of the motor 42 to drive disc 48 clockwise, viewing Fig. 4, through belt-pulley means 44, gear reduction unit 36 and shaft 46, the elements 64 successively move into the concavity of the track corner 10a within which a portion of the disc 48 is disposed. While the elements 64 are free to swing with respect to the disc 48 through substantially 180° of rotation with disc 48, they are gradually and progressively swung to an operative position where the faces 78 thereof project beyond the periphery of disc 48 by bar 82. As seen in Fig. 4 the rollers 76 come into contact with the S-shaped cam edge 92 of bar 82 and inasmuch as the distance between bar 82 and plate 80 progressively decreases in the direction of rotation of the disc 48, rollers 76 gradually move into contact with plate 80 at about point 98. By the time rollers 76 have progressed to approximately point 100 on the plate 80, the element 64 will have been swung to a point where the faces 78 are substantially radial to the disc 48.

The distance between the elements 64 is manifestly the same as the distance between the carriages 12 and, therefore, each pair of dogs 68 and 70 engages a stem 16 embracing the chain 20. At any given time, at least two of the elements 64 will be operating to advance the conveyor by engagement with two corresponding stems 16. When the rollers 76 reach approximately point 102 on the plate 80, the elements 64 are permitted to swing anti-clockwise as rollers 76 follow the receding length 90c of the outermost edge of plate 80. The pressure exerted upon the carriages 12 by the receding element 64 progressively lessens until the corresponding stem 16 moves away from the faces 78 and through a straight path of travel along the track length 10c.

Accordingly, as the disc 48 moves the elements 64 away from the track length 10c, the faces 78 of the dogs 68 and 70 do not break loose from the stems 16 or slide therefrom; instead, the elements 64 become less and less effective in the pushing action on the carriages 12 as the rollers 76 travel along the edge length 90c. By the time rollers 76 reach point 104 if still in engagement with each length 90c, they will move entirely out of engagement with the plate 80.

It is significant to note that it is impossible for the rollers 76 to move into engagement with the plate 80 and progress along the edge length 90a without being swung clockwise thereby (viewing Fig. 4) because of the initial swinging movement that is imparted to the elements 64 by the bar 82.

Noteworthy also is the fact that while the teeth 62 of the disc 48 assist elements 64 in advancing the conveyor, their primary function is to receive the chain 20 in the manner shown in Fig. 4 and to maintain an arcuate configuration therein along the track corner 10a. Otherwise, the lengths of the chain between the stems 16 would remain substantially straight along the arcuate track length 10a, tending to cause binding of the carriages 12 with the arcuate length 10a of the track. The peripheral edge of the disc 48 with its teeth 62 tend to cause the carriages 12 to progressively turn from the time they proceed from track length 10b and until they move into the track length 10c. In this respect also, the radial disposition of the faces 78 and the flat engagement thereof with the stems 16 also aids in imparting a gradual and progressive turning moment in the yokes 14 during the travel of the rollers 18 along the arcuate corner 10a.

In all respects, therefore, the drive above described is capable of advancing the conveyor at a predetermined rate, depending upon the speed of the motor 42, all without vibration, intermittent stopping and starting, undue drag, chattering, or likelihood of jamming and other break-down in operation.

Having thus described the invention what is claimed as new and desired to be secured by Letters Patent is:

1. In combination with a conveyor having a plurality of carriages each provided with a stem, and a chain having interconnected links, each stem being joined to a link, structure for driving the chain and the carriages comprising a chain drive including a rotatable disc having peripheral teeth receiving the links of the chain; means operably coupled with the disc for rotating the same; and a carriage drive including a plurality of elements carried by the disc for rotation therewith and arranged in a circular pattern adjacent said teeth, each element being swingable on the disc about an axis parallel with the axis of rotation of the disc, and a cam rigidly mounted adjacent the disc for holding the elements in a position extended beyond said periphery by the disc in position to engage the stems when the links are received by the teeth, each element having a stem-engaging dog on one side of its axis of swinging movement and cam engaging means on the opposite side of its axis of swinging movement, said cam being substantially semi-circular whereby the elements are held in said position thereby during one portion of the cycle of rotation of the elements about said axis of the disc, and are free to swing with respect to the disc during the remainder of said cycle of rotation of the elements about said axis of the disc.

2. The invention of claim 1, and a rigidly mounted guide bar adjacent one end of the cam, disposed for engagement by the cam-engaging means of the elements for initiating swinging movement of the elements to stem-engaging positions as the elements commence said one portion of their cycle of rotation, the bar being spaced from the cam whereby the cam-engaging means pass between the cam and the bar.

3. The invention of claim 2, said bar having a stretch disposed to rigidly hold the cam-engaging means against the cam immediately prior to movement of the dogs into engagement with the stems.

4. The invention of claim 1, each element having a pair of identical interconnected sections embracing the disc, each section of each element having a stem-engaging dog, the dogs embracing the chain when the dogs engage the stems.

5. The invention of claim 4, the disc having a slot for each element respectively, said portions of the elements having a shaft interconnecting the same, said shaft passing through corresponding slots, whereby the extent of said free-swinging movement of the elements is limited by the shafts engaging the ends of the slots.

References Cited in the file of this patent

UNITED STATES PATENTS

| | | |
|---|---|---|
| 500,807 | Hunt | July 4, 1893 |
| 1,639,758 | Webb | Aug. 23, 1927 |
| 1,903,488 | Stibbs | Apr. 11, 1933 |
| 1,960,719 | Stibbs | May 24, 1934 |
| 2,057,173 | Waalkes | Oct. 13, 1936 |
| 2,130,433 | Webb | Sept. 20, 1938 |
| 2,309,587 | Hassler | Jan. 26, 1943 |
| 2,349,578 | Ellen | May 23, 1944 |
| 2,796,974 | Weinberger | June 25, 1957 |

FOREIGN PATENTS

| | | |
|---|---|---|
| 263,160 | Great Britain | Apr. 14, 1927 |
| 982,622 | France | June 13, 1951 |